(12) United States Patent
Tran et al.

(10) Patent No.: US 12,659,198 B2
(45) Date of Patent: Jun. 16, 2026

(54) SCALABLE ROUTING TOPOLOGIES THAT ENABLE INCREASED LOADS ON SINGLE-ENDED OR DIFFERENTIAL CHANNELS

(71) Applicant: Raytheon Company, Tewksbury, MA (US)

(72) Inventors: Thanh Thien Tran, Houston, TX (US); Colin Michael McKinney, Prosper, TX (US); Glenn D. Henseler, Plano, TX (US)

(73) Assignee: Raytheon Company, Arlington, VA (US)

( * ) Notice: Subject to any disclaimer, the term of this patent is extended or adjusted under 35 U.S.C. 154(b) by 255 days.

(21) Appl. No.: 18/520,181

(22) Filed: Nov. 27, 2023

(65) Prior Publication Data

US 2025/0175368 A1     May 29, 2025

(51) Int. Cl.
    *H04L 25/02*          (2006.01)
(52) U.S. Cl.
    CPC ...... *H04L 25/0272* (2013.01); *H04L 25/0278* (2013.01); *H04L 25/028* (2013.01); *H04L 25/0298* (2013.01)
(58) Field of Classification Search
    CPC ........... H03H 11/42; H03H 2001/0071; H03H 3/00; H03H 7/06; H03H 7/52; H03H 2001/0085; H03H 2250/00; H03H 7/1775; H03H 7/422; H03H 7/463; H03H 7/38; H04B 7/10; H04B 10/6972; H04B 5/77; H04B 7/0689; H04B 7/0871; H04B 1/1027; H04B 1/18; H04B 1/525; H04B 10/25752; H04B 10/40; H04B 10/505; H04B 10/50575; H04B 10/50595; H04B 10/516; H04B 10/801; H04B 17/21; H01Q 21/28;
(Continued)

(56) References Cited

U.S. PATENT DOCUMENTS 7,893,720 B2    2/2011  Yadav et al.
8,885,645 B2   11/2014  Rohatschek et al.
(Continued)

FOREIGN PATENT DOCUMENTS

TW          I751630  B       1/2022

OTHER PUBLICATIONS

Ibrahim, "How to Terminate LVDS Connections," May 2018, 3 pages.
(Continued)

*Primary Examiner* — John W Poos

(57)              ABSTRACT

A system includes a driver and multiple loads configured to communicate with the driver. The system also includes a primary signal line configured to transport one or more electrical signals between the driver and the multiple loads. The system further includes multiple branch signal lines each configured to transport at least one of the one or more electrical signals and each coupled to one or more of the multiple loads. In addition, the system includes a splitter coupling the primary signal line and the branch signal lines. The primary signal line has a first characteristic impedance, and the branch signal lines collectively have a second characteristic impedance that matches or substantially matches the first characteristic impedance. In some cases, the primary signal line and the branch signal lines may have equal or substantially equal trace widths.

20 Claims, 6 Drawing Sheets

(58) Field of Classification Search
CPC .... H01Q 21/065; H01Q 1/243; H01Q 9/0407; H01Q 1/50; H01Q 21/0006; H01Q 9/0435; H01Q 1/007; H01Q 1/2225; H01Q 1/2283; H01Q 1/24; H01Q 1/241; H01Q 1/246; H01Q 1/38; H01Q 1/48; H01Q 3/2676; H01Q 5/35; H01Q 5/50; H01Q 9/16; H01Q 9/27; H01Q 11/08; H01Q 21/0025; H01Q 21/0075; H01Q 21/08; H01Q 21/26; H01Q 1/2216; H01Q 1/27; H01Q 1/32; H01Q 1/3275; H01Q 1/521; H01Q 13/00; H01Q 15/14; H01Q 21/0037; H01Q 21/064; H01Q 21/12; H01Q 21/24; H01Q 25/001; H01Q 3/26; H01Q 3/2623; H01Q 3/267; H01Q 3/32; H01Q 3/38; H01Q 3/40; H01Q 5/00; H01Q 5/307; H01Q 5/321; H01Q 5/335; H01Q 5/42; H01Q 5/48; H01Q 9/0414; H01Q 9/045; H01Q 9/0457; H01Q 9/0478; H01Q 9/065; H01Q 9/265; H01Q 9/28; H01Q 9/40; H01Q 9/42; H01Q 1/002; H01Q 1/02; H01Q 1/52; H01Q 1/523; H01Q 13/08; H01Q 13/10; H01Q 17/00; H01Q 19/106; H01Q 21/0087; H01Q 21/06; H01Q 21/22; H01Q 3/24; H01Q 3/30; H01Q 3/36; H01Q 5/357; H01Q 5/378; H01Q 5/40; H01Q 7/00
See application file for complete search history.

(56) References Cited

U.S. PATENT DOCUMENTS

| | | | | |
|---|---|---|---|---|
| 9,203,348 B2* | 12/2015 | Ahmed | ..................... | H03F 3/68 |
| 10,027,798 B2* | 7/2018 | El-Gawady | ....... | H04M 3/42153 |
| 10,756,798 B2* | 8/2020 | Berg | ......................... | H01Q 3/30 |
| 2014/0292378 A1* | 10/2014 | Suzuki | .......... | H03K 19/018571 |
| | | | | 327/108 |

OTHER PUBLICATIONS

Lu et al., "A microstrip differential power divider," 2016 IEEE International Workshop on Electromagnetics: Applications and Student Innovation Competition (iWEM), May 2016, 3 pages.
Wu et al., "Balanced Power Dividers/Combiners," Balanced Microwave Filters, Mar. 2018, 36 pages.
Texas Instruments, "Multipoint-Lvds Quad Differential Line Driver," Mar. 2004, 23 pages.

* cited by examiner

SCALABLE ROUTING TOPOLOGIES THAT ENABLE INCREASED LOADS ON SINGLE-ENDED OR DIFFERENTIAL CHANNELS

TECHNICAL FIELD

This disclosure is generally directed to electrical systems and methods. More specifically, this disclosure is directed to scalable routing topologies that enable increased loads on single-ended or differential channels.

BACKGROUND

Many electrical systems include loads that are coupled to buses or other electrical connections. For example, one load can be coupled to a low-voltage differential signaling (LVDS) signal line, and multiple loads can be coupled to a multipoint low-voltage differential signaling (M-LVDS) signal line. Differential signaling typically involves electrically transmitting information using two complementary signals over a pair of electrical conductors. One load or multiple loads can also be coupled to a single-ended signal line, where information is electrically transmitted using one signal over a signal electrical conductor.

SUMMARY

This disclosure relates to scalable routing topologies that enable increased loads on single-ended or differential channels.

In a first embodiment, an apparatus includes a primary signal line configured to transport one or more electrical signals. The apparatus also includes multiple branch signal lines each configured to transport at least one of the one or more electrical signals and each configured to be coupled to one or more loads. The apparatus further includes a splitter coupling the primary signal line and the branch signal lines. The primary signal line has a first characteristic impedance, and the branch signal lines collectively have a second characteristic impedance that matches or substantially matches the first characteristic impedance.

In a second embodiment, a system includes a driver and multiple loads configured to communicate with the driver. The system also includes a primary signal line configured to transport one or more electrical signals between the driver and the multiple loads. The system further includes multiple branch signal lines each configured to transport at least one of the one or more electrical signals and each coupled to one or more of the multiple loads. In addition, the system includes a splitter coupling the primary signal line and the branch signal lines. The primary signal line has a first characteristic impedance, and the branch signal lines collectively have a second characteristic impedance that matches or substantially matches the first characteristic impedance.

In a third embodiment, a method includes transporting one or more electrical signals over a primary signal line and multiple branch signal lines, where each of the branch signal lines is coupled to one or more loads. The method also includes passing the one or more electrical signals through a splitter coupling the primary signal line and the branch signal lines. The primary signal line has a first characteristic impedance, and the branch signal lines collectively have a second characteristic impedance that matches or substantially matches the first characteristic impedance.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
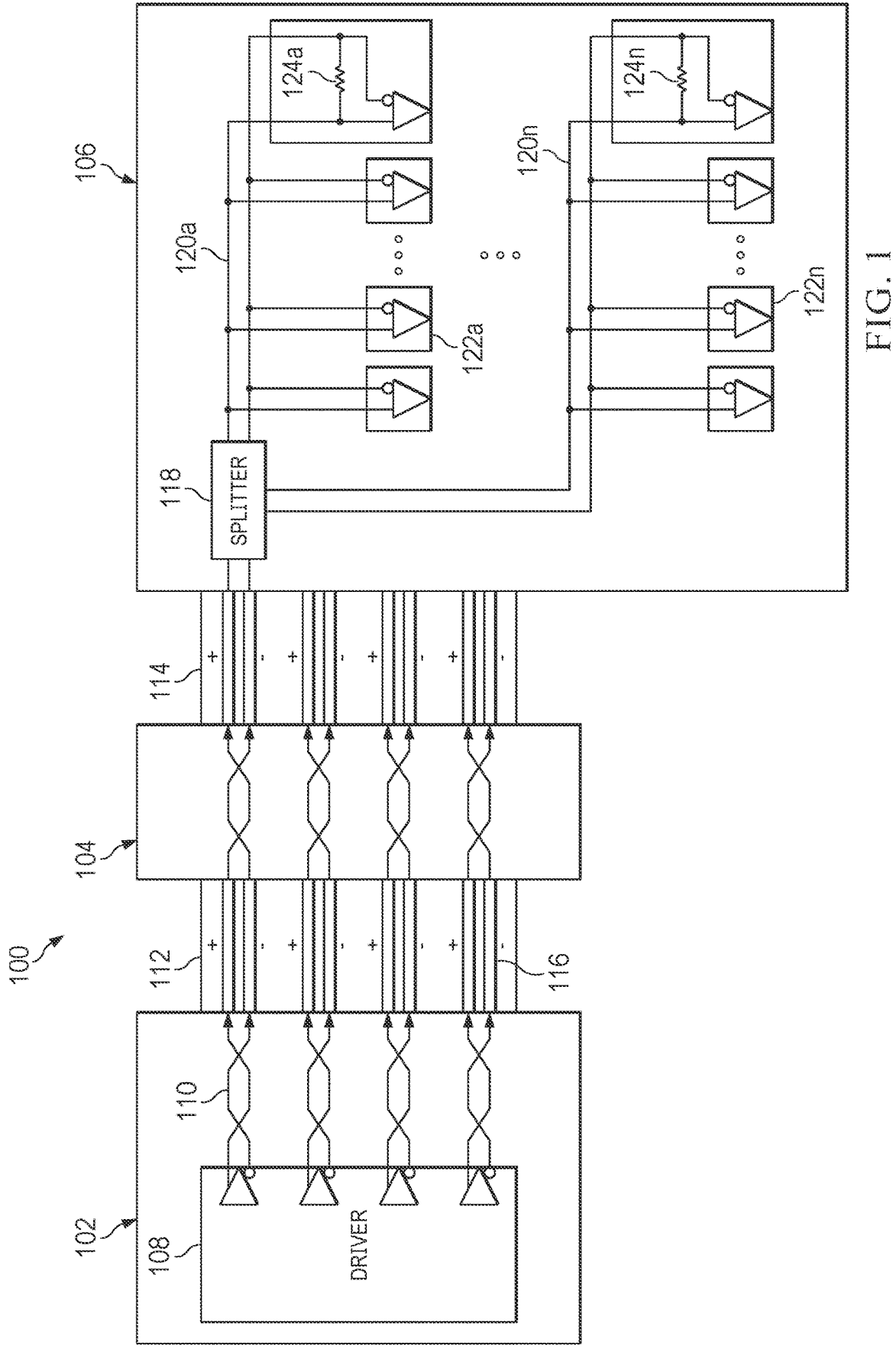
FIG. 1 illustrates an example system supporting a routing topology that enables increased loads on differential channels according to this disclosure.

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, many electrical systems include loads that are coupled to buses or other electrical connections. For example, one load can be coupled to a low-voltage differential signaling (LVDS) signal line, and multiple loads can be coupled to a multipoint low-voltage differential signaling (M-LVDS) signal line. Differential signaling typically involves electrically transmitting information using two complementary signals over a pair of electrical conductors. One load or multiple loads can also be coupled to a single-ended signal line, where information is electrically transmitted using one signal over a signal electrical conductor.

Unfortunately, various problems can arise when a large number of loads are coupled to a single-ended or differential signal line. For example, excessive loading of a single-ended or differential signal line can cause timing violations or other issues to arise. One approach for overcoming this or other problems can involve increasing the number of signal lines being used, such as by doubling the number of single-ended or differential signal lines, so that more loads can be coupled to the increased number of signal lines without overloading any individual one of the signal lines. However, this can create significant synchronization or other timing issues for loads coupled to different signal lines, and extensive simulations and controlled device layouts may be needed to compensate for timing errors. This may also not be an option in some systems where there are not additional pins or other connectors available for increasing the number of signal lines being used. In addition, this can increase the number of circuit components needed for supporting communications over the increased number of single-ended or differential signal lines, which can increase the size, weight, power, and cost (SWaP-C) of an overall system.

This disclosure provides various scalable routing topologies that enable increased loads on single-ended or differential channels. As described in more detail below, various routing topologies for printed circuit boards or other structures can be used to increase the number of loads on one or more signal lines while reducing or avoiding issues related to timing violations or other problems caused by overloading and while reducing or avoiding issues related to synchronization or other problems caused by using separate signal lines. Each of these routing topologies can use a primary signal line that is split into multiple branch signal lines, where various loads can be coupled to the branch signal lines. The primary signal line and each of the branch signal lines may be single-ended or differential depending on the implementation. The branch signal lines are designed so that the characteristic impedance (such as the Thevenin-equivalent impedance) of all of the branch signal lines collectively matches or substantially matches the characteristic impedance of the primary signal line. For example, assume the primary signal line has a characteristic impedance of X ohms, and assume there are N branch signal lines. In that case, each branch signal line can have a characteristic impedance of N×X ohms, thereby causing the collective characteristic impedance of all branch signal lines to equal or substantially equal X ohms. The characteristic impedance $Z_0$ of a conductor can be expressed as follows.

$$Z_0 = \sqrt{\frac{L}{C}}$$

Here, L represents an equivalent inductance of one conductor, and C represents an equivalent capacitance of one conductor. When the single-ended characteristic impedance is equal to $Z_0$, the differential characteristic impedance is equal to $2 \times Z_0$.

Moreover, the routing topologies allow a first ground plane to be positioned closer to the primary signal line in the printed circuit board or other structure, where the first ground plane can be cut or removed (or not formed at all) in areas where the branch signal lines are positioned. A second ground plane is positioned further from the branch signal lines in the printed circuit board or other structure (compared to the distance of the first ground plane from the primary signal line), where the second ground plane defines the characteristic impedance of the branch signal lines. In some cases, this may allow the primary signal line and the branch signal lines to all have the same or substantially the same trace widths while still allowing the branch signal lines to each achieve a higher characteristic impedance compared to the primary signal line.

In this way, the routing topologies described in this patent document allow loads placed on the branch signal lines to transmit or receive electrical signals using the same primary signal line. This may allow a suitable number of loads to be placed on each of the branch signal lines while reducing or avoiding problems with overloading and while reducing or avoiding timing violations, synchronization issues, or other issues. As a particular example, this may allow up to eighteen or more loads to be placed on two or more branch signal lines supporting multipoint low-voltage differential signaling or other branch signal lines. Moreover, the impedance matching between the primary signal line and the collection of branch signal lines can help to reduce or minimize transmission line effects (such as reflections) and/or improve signal qualities. In addition, by modifying the distances between the primary and branch signal lines and their respective ground planes so that the primary and branch signal lines can achieve desired impedances, this can avoid situations where higher impedances require trace widths that are too small to be fabricated reliably.

FIG. 1 illustrates an example system 100 supporting a routing topology that enables increased loads on differential channels according to this disclosure. As shown in FIG. 1, the system 100 includes multiple circuit card assemblies (CCAs) 102, 104, and 106 that communicate via various differential signal lines. The circuit card assembly 102 may represent a controller CCA that can include various circuits or other components for controlling various operations in the system 100. The circuit card assembly 104 may represent a pass-thru CCA that allows various signals to be transported between the circuit card assemblies 102 and 106. The circuit card assembly 106 may represent a load CCA that can include various circuits or other components configured to perform various operations under the control of the circuit card assembly 102. Note that the number of circuit card assemblies shown in FIG. 1 is for illustration only and that other numbers of circuit card assemblies or other structures may be used to carry various circuit components. For example, in other embodiments, the circuit card assembly 104 may be omitted. As another example, the circuitry of the circuit card assemblies 102 and 106 (and optionally the circuit card assembly 104) may be combined into a single structure. Each circuit card assembly 102, 104, and 106 includes any suitable substrate or other structure in or on which various circuit components can be formed or placed.

The circuit card assembly 102 includes a driver 108, which can be used to control or support communications over multiple differential signal lines 110. Each differential signal line 110 is formed using a pair of electrical conductors. The driver 108 may be used to transmit or receive any suitable information over the differential signal lines 110. In some cases, for example, the driver 108 may generate a clock signal that is transmitted over the first (top) differential signal line 110, and a second differential signal line 110 may be used to transport data signals to or from the driver 108. A third differential signal line 110 may be used to indicate whether the driver 108 is allowing other components to transmit or receive data, and a fourth differential signal line 110 may be used to transport another signal (such as a control signal that indicates whether amplifiers used by loads or other components should be turned on or off). Note that the number of differential signal lines 110 here is for illustration only and that other numbers of differential signal lines 110 may be used, such as one, two, three, or more than four differential signal lines 110. Also, these differential signal lines 110 may be used to transport any suitable signal(s) and are not limited to the specific types of signals discussed above. The driver 108 includes any suitable structure configured to control or support communications over one or more differential signal lines. As a particular example, the driver 108 may represent the SN65MLVD047 multipoint-LVDS quad differential line driver from TEXAS INSTRUMENTS, INC. Each differential signal line 110 represents any suitable conductive traces or other conductive pathways configured to transport differential electrical signals. Each signal line 110 may be fabricated using any suitable conductive material(s) (such as one or more metals like copper) and in any suitable manner.

In this example, the circuit card assemblies 102, 104, and 106 are coupled together using connector blocks 112 and 114, each of which includes electrical conductors 116. Each electrical conductor 116 represents a conductive structure that can transport the electrical signals associated with one pathway in a differential signal line 110, so two electrical conductors 116 can be associated with each differential signal line 110. In the illustrated example, each connector block 112 and 114 includes eight electrical conductors 116 since there are four pairs of conductors forming four differential signal lines 110 here, although the number of differential signal lines 110 (and therefore the number of electrical conductors 116) can vary. Each electrical conductor 116 may be fabricated using any suitable conductive material(s) (such as one or more metals like copper) and in any suitable manner. Each connector block 112 and 114 may include any suitable number of electrical conductors 116, and each electrical conductor 116 may have any suitable form. In some embodiments, each electrical conductor 116 may represent a spring-loaded electrical connector, such as a "pogo" connector. Note, however, that the use of the connector blocks 112 and 114 is optional, such as when the circuit card assemblies 102, 104, and 106 can be coupled directly to one another.

As shown in FIG. 1, the top differential signal line 110 (which may be referred to as a primary signal line 110) is coupled to a splitter 118. The splitter 118 is also coupled to multiple additional differential signal lines 120a-120n (which may be referred to as branch signal lines 120a-120n). Each of the branch signal lines 120a-120n is respectively coupled to multiple loads 122a-122n, and each of the branch signal lines 120a-120n is respectively terminated using a resistance 124a-124n that matches or substantially matches the differential characteristic impedance of the branch. Each branch signal line 120a-120n is formed using a pair of electrical conductors, each of which may be fabricated using any suitable conductive material(s) (such as one or more metals like copper) and in any suitable manner. Each load 122a-122n represents any suitable circuit component(s) that can receive electrical signals from and/or provide electrical signals to the driver 108 via the differential signal lines 110, 120a-120n. As a particular example, each load 122a-122n may represent an application specific integrated circuit (ASIC), which may have a high impedance input (such as one greater than 20 KΩ). Each resistance 124a-124n represents a termination resistor connected across the two electrical conductors of one of the branch signal lines 120a-120n. The termination resistor can be equal or substantially equal to the differential characteristic impedance of the two electrical conductors in one branch, which also represents a sum of the characteristic impedance of the two conductors in that branch.

The splitter 118 is configured to divide the electrical pathways of the primary signal line 110 into the electrical pathways of the multiple branch signal lines 120a-120n. This allows differential electrical signals from the driver 108 coupled to the primary signal line 110 to be provided to the loads 122a-122n coupled to the branch signal lines 120a-120n. This also or alternatively allows differential electrical signals from the loads 122a-122n coupled to the branch signal lines 120a-120n to be provided to the driver 108 coupled to the primary signal line 110. As a result, loads 122a-122n coupled to multiple branch signal lines 120a-120n are able to interact with the driver 108 over a common primary signal line 110. Note that while one splitter 118 is shown here as splitting one primary signal line 110 into one set of branch signal lines 120a-120n, multiple splitters 118 may be used to split multiple primary signal lines 110 into multiple sets of branch signal lines 120a-120n.

As described in more detail below, each primary signal line 110, its associated splitter 118, and its associated set of branch signal lines 120a-120n can be designed so that the differential characteristic impedance of the primary signal line 110 matches or substantially matches (such as to within 5%) the differential characteristic impedance of all of the branch signal lines 120a-120n coupled to that primary signal line 110. For example, the Thevenin-equivalent impedance of all of the branch signal lines 120a-120n coupled to a primary signal line 110 can match or substantially match the differential characteristic impedance of the primary signal line 110. If the primary signal line 110 has a differential characteristic impedance of about X ohms and there are N branch signal lines 120a-120n, each of the branch signal lines 120a-120n can have a differential characteristic impedance of about $N \times X$ ohms, and each of the resistances 124a-124n can have a resistance of about $N \times X$ ohms. Because the branch signal lines 120a-120n are arranged electrically in parallel with one another, the larger parallel differential characteristic impedances of the branch signal lines 120a-120n collectively form a lower differential characteristic impedance that matches or substantially matches the differential characteristic impedance of the primary signal line 110.

Moreover, as described in more detail below, a first ground plane associated with a primary signal line 110 can be positioned closer to the primary signal line 110, and the first ground plane can be cut, removed, or otherwise omitted in areas where the branch signal lines 120a-120n are positioned. In those areas, a second ground plane associated with the branch signal lines 120a-120n can be positioned further from the branch signal lines 120a-120n. This can help to increase the differential characteristic impedance of each of the branch signal lines 120a-120n relative to the differential characteristic impedance of the primary signal line 110. This can also allow the branch signal lines 120a-120n to achieve the larger differential characteristic impedance without requiring unreliably small trace widths to be used by the branch signal lines 120a-120n. In some cases, this can allow the primary signal line 110 and the branch signal lines 120a-120n to have trace widths that match or substantial match one another (such as to within 5%).

Although FIG. 1 illustrates one example of a system 100 supporting a routing topology that enables increased loads on differential channels, various changes may be made to FIG. 1. For example, a routing topology that enables increased loads on differential channels may be used in any other suitable system and is not limited to the specific system 100 shown here. Also, the system 100 may include any suitable number of circuit card assemblies, drivers, connector blocks, differential signal lines, splitters, loads, and resistances. As a particular example, the splitter 118 may be coupled to n branch signal lines 120a-120n, where n is an integer greater than or equal to two. As another particular example, each of the branch signal lines 120a-120n may be coupled to any suitable number of loads 122a-122n.

Figure 2:
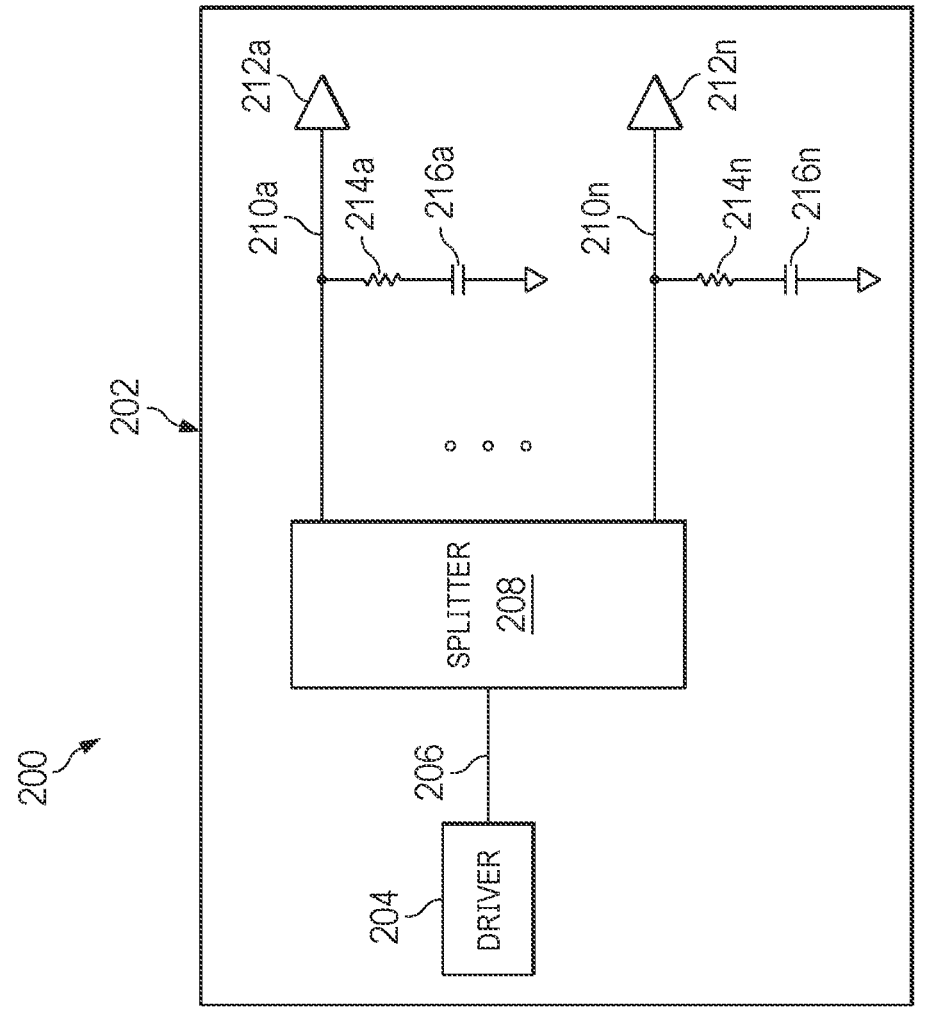
FIG. 2 illustrates an example system supporting a routing topology that enables increased loads on single-ended channels according to this disclosure.

FIG. 2 illustrates an example system 200 supporting a routing topology that enables increased loads on single-ended channels according to this disclosure. As shown in FIG. 2, the system 200 includes a circuit card assembly 202 with components that communicate via at least one single-ended signal line. The circuit card assembly 202 includes any suitable substrate or other structure in or on which various circuit components can be formed or placed. Note that the number of circuit card assemblies shown in FIG. 2 is for illustration only and that other numbers of circuit card assemblies or other structures may be used to carry various circuit components.

The circuit card assembly 202 includes a driver 204, which can be used to control or support communications over at least one single-ended signal line 206. Each single-ended signal line 206 is formed using one electrical conductor. The driver 204 may be used to transmit or receive any suitable information over the single-ended signal line(s) 206. The driver 204 includes any suitable structure configured to control or support communications over one or more single-ended signal lines. Each single-ended signal line 206 represents any suitable conductive trace or other conductive pathway configured to transport single-ended electrical signals. Each signal line 206 may be fabricated using any suitable conductive material(s) (such as one or more metals like copper) and in any suitable manner.

As shown in FIG. 2, a splitter 208 is coupled to the single-ended signal line 206 (which may be referred to as a primary signal line 206) and to multiple additional single-ended signal lines 210a-210n (which may be referred to as branch signal lines 210a-210n). Each of the branch signal lines 210a-210n is respectively coupled to at least one load 212a-212n, and each of the branch signal lines 210a-210n is respectively terminated using a resistance 214a-214n and a capacitance 216a-216n. Each branch signal line 210a-210n is formed using an electrical conductor, which may be fabricated using any suitable conductive material(s) (such as one or more metals like copper) and in any suitable manner. Each load 212a-212n represents any suitable circuit component(s) that can receive electrical signals from and/or provide electrical signals to the driver 204 via the single-ended signal lines 206, 210a-210n, such as an ASIC. Each resistance 214a-214n represents any suitable resistive structure providing a desired level of resistance between one of the branch signal lines 210a-210n and ground. Each capacitance 216a-216n represents any suitable capacitive structure providing a desired level of capacitance between one of the branch signal lines 210a-210n and ground.

The splitter 208 is configured to divide the electrical pathway of the primary signal line 206 into the electrical pathways of the branch signal lines 210a-210n. This allows single-ended electrical signals from the driver 204 coupled to the primary signal line 206 to be provided to the loads 212a-212n coupled to the branch signal lines 210a-210n. This also or alternatively allows single-ended electrical signals from the loads 212a-212n coupled to the branch signal lines 210a-210n to be provided to the driver 204 coupled to the primary signal line 206. As a result, loads 212a-212n coupled to multiple branch signal lines 210a-210n are able to interact with the driver 204 over a common primary signal line 206. Note that while one splitter 208 is shown here as splitting one primary signal line 206 into one set of branch signal lines 210a-210n, multiple splitters 208 may be used to split multiple single-ended signal lines 206 into multiple sets of branch signal lines 210a-210n.

As described in more detail below, each primary signal line 206, its associated splitter 208, and its associated set of branch signal lines 210a-210n can be designed so that the single-ended characteristic impedance of the primary signal line 206 matches or substantially matches (such as to within 5%) the single-ended characteristic impedance of all of the branch signal lines 210a-210n coupled to that primary signal line 206. For example, the Thevenin-equivalent impedance of all of the branch signal lines 210a-210n coupled to a primary signal line 206 can match or substantially match the single-ended characteristic impedance of the primary signal line 206. If the primary signal line 206 has a singled-ended characteristic impedance of about X ohms and there are N branch signal lines 210a-210n, each of the branch signal lines 210a-210n can have a single-ended characteristic impedance of about N×X ohms, and each of the resistances 214a-214n can have a resistance of about N×X ohms. Because the branch signal lines 210a-210n are arranged electrically in parallel with one another, the larger parallel single-ended characteristic impedances of the branch signal lines 210a-210n collectively form a lower single-ended characteristic impedance that matches or substantially matches the characteristic impedance of the primary signal line 206.

Moreover, as described in more detail below, a first ground plane associated with a primary signal line 206 can be positioned closer to the primary signal line 206, and the first ground plane can be cut, removed, or otherwise omitted in areas where the branch signal lines 210a-210n are positioned. In those areas, a second ground plane associated with the branch signal lines 210a-210n can be positioned further from the branch signal lines 210a-210n. This can help to increase the singled-ended characteristic impedance of each of the branch signal lines 210a-210n relative to the single-ended characteristic impedance of the primary signal line 206. This can also allow the branch signal lines 210a-210n to achieve the larger single-ended characteristic impedance without requiring unreliably small trace widths to be used by the branch signal lines 210a-210n. In some cases, this can allow the primary signal line 206 and the branch signal lines 210a-210n to have trace widths that match or substantial match one another (such as to within 5%).

Although FIG. 2 illustrates one example of a system 200 supporting a routing topology that enables increased loads on single-ended channels, various changes may be made to FIG. 2. For example, a routing topology that enables increased loads on single-ended channels may be used in any other suitable system and is not limited to the specific system 200 shown here. Also, the system 200 may include any suitable number of circuit card assemblies, drivers, single-ended signal lines, splitters, loads, resistances, and capacitances. As a particular example, the splitter 208 may be coupled to n branch signal lines 210a-210n, where n is an integer greater than or equal to two. As another particular example, each of the branch signal lines 210a-210n may be coupled to any suitable number of loads 212a-212n.

Figure 3:
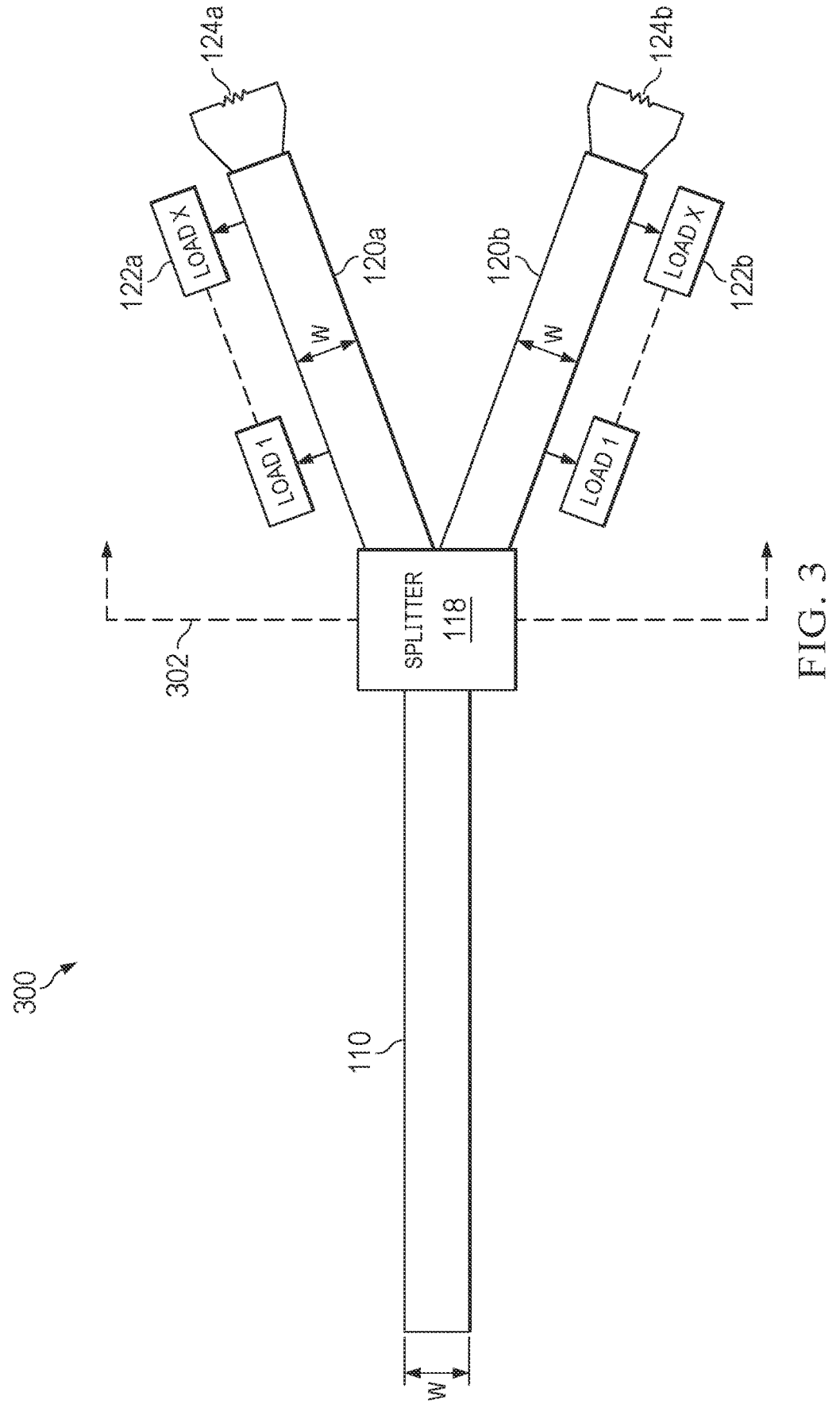
FIGS. 3 and 4 illustrate example routing topologies that enable increased loads on single-ended and differential channels according to this disclosure.
Figure 4:
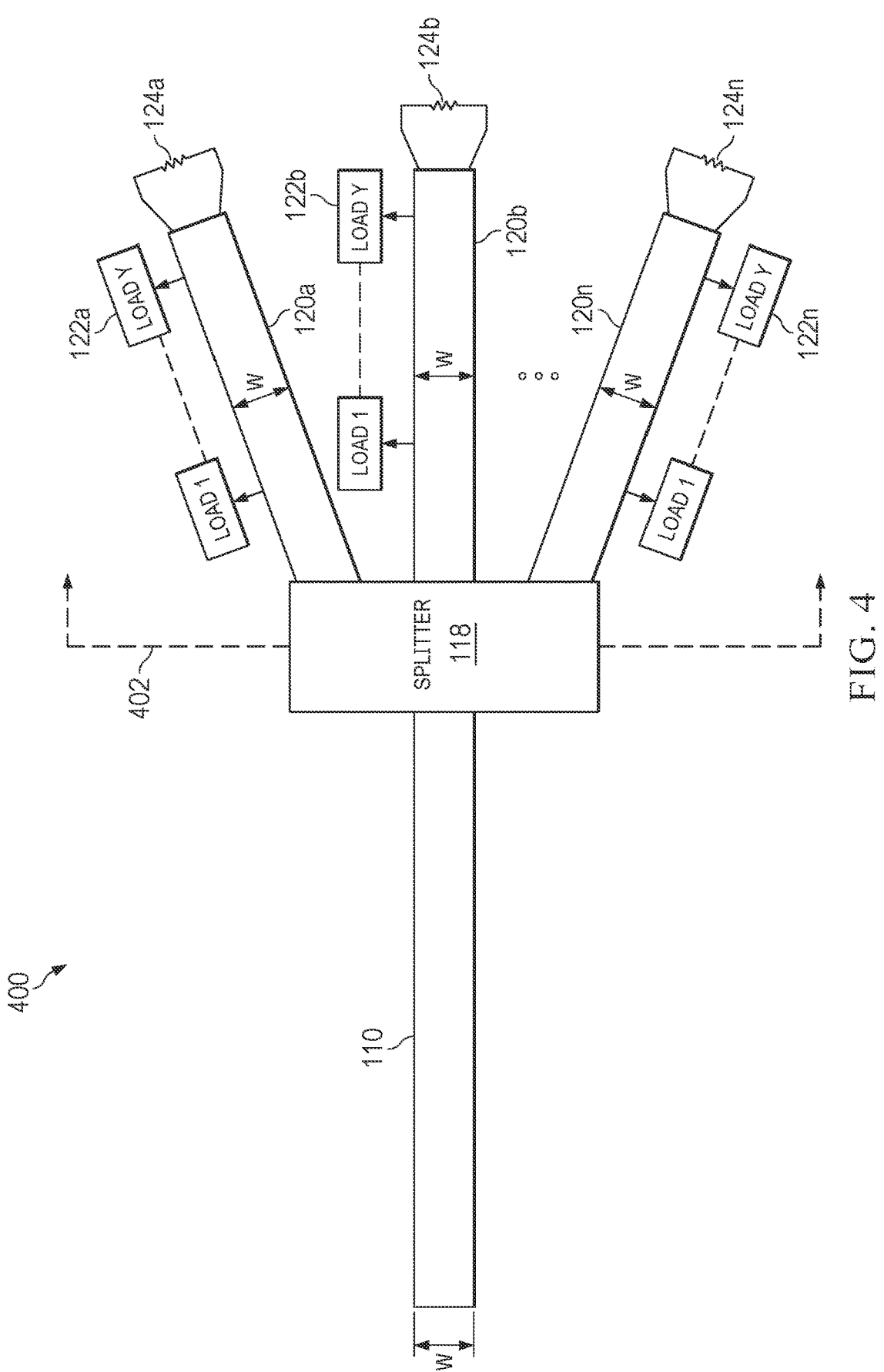

FIGS. 3 and 4 illustrate example routing topologies 300 and 400 that enable increased loads on single-ended and differential channels according to this disclosure. For ease of explanation, each of the routing topologies 300 and 400 shown in FIGS. 3 and 4 is described as being used in the system 100 shown in FIG. 1. However, each of the routing topologies 300 and 400 may be used in any other suitable systems, such as when each of the routing topologies 300 and 400 is used in the system 200 shown in FIG. 2.

As shown in FIG. 3, the routing topology 300 uses the splitter 118 to split the primary signal line 110 into two branch signal lines 120a-120b. The branch signal line 120a is coupled to multiple loads 122a, and the branch signal line 120b is coupled to multiple loads 122b. Each branch signal line 120a-120b may be coupled to any suitable number of loads 122a-122b. In some cases, each branch signal line 120a-120b may be coupled to nine loads 122a-122b, although this is for illustration only, and more or fewer loads 122a-122b may be coupled to each branch signal line 120a-120b. Each branch signal line 120a-120b is terminated using an associated resistance 124a-124b that matches or substantially matches the differential characteristic impedance of the branch. In some embodiments, the primary signal line 110 can extend between a driver 108 or other component and an area relatively close to where the loads 122a-122b are positioned. The splitter 118 can split the primary signal line 110 into the branch signal lines 120a-120b near that area, and the branch signal lines 120a-120b can be coupled to the loads 122a-122b.

As noted above, the primary signal line 110, splitter 118, and branch signal lines 120a-120b can be designed so that the differential characteristic impedance of the primary signal line 110 matches or substantially matches (such as to within 5%) the differential characteristic impedance of both branch signal lines 120a-120b coupled to the primary signal line 110. For example, the Thevenin-equivalent impedance 302 of the branch signal lines 120a-120b can match or substantially match the differential characteristic impedance of the primary signal line 110. If the primary signal line 110 has a differential characteristic impedance of about 1000, each of the branch signal lines 120a-120n can have a differential characteristic impedance of about 2000, and each of the resistances 124a-124n can have a resistance of about 2000. Since the branch signal lines 120a-120b are arranged electrically in parallel, the branch signal lines 120a-120b collectively form a differential characteristic impedance that matches or substantially matches the differential characteristic impedance of the primary signal line 110. Impedance matching can significantly reduce reflections, improve signal integrity, or obtain other benefits. Moreover, as noted above, ground planes can be configured so that the widths W of the primary signal line 110 and the branch signal lines 120a-120b can be equal or substantially equal in some embodiments.

As shown in FIG. 4, the routing topology 400 uses the splitter 118 to split the primary signal line 110 into three or more branch signal lines 120a-120n. The branch signal line 120a is coupled to multiple loads 122a, the branch signal line 120b is coupled to multiple loads 122b, and so on. Each branch signal line 120a-120n may be coupled to any suitable number of loads 122a-122b. In some cases, each of three branch signal lines 120a-120n may be coupled to six loads 122a-122n, although this is for illustration only, and more or fewer loads 122a-122b may be coupled to each branch signal line 120a-120b. Each branch signal line 120a-120n is terminated using an associated resistance 124a-124n that matches or substantially matches the differential characteristic impedance of the branch. In some embodiments, the primary signal line 110 can extend between a driver 108 or other component and an area relatively close to where the loads 122a-122n are positioned. The splitter 118 can split the primary signal line 110 into the branch signal lines 120a-120n near that area, and the branch signal lines 120a-120n can be coupled to the loads 122a-122n.

As noted above, the primary signal line 110, splitter 118, and branch signal lines 120a-120n can be designed so that the differential characteristic impedance of the primary signal line 110 matches or substantially matches (such as to within 5%) the differential characteristic impedance of all branch signal lines 120a-120n coupled to the primary signal line 110. For example, the Thevenin-equivalent impedance 302 of the branch signal lines 120a-120n can match or substantially match the differential characteristic impedance of the primary signal line 110. If the primary signal line 110 has a differential characteristic impedance of about $100\Omega$ and there are N branch signal lines 120a-120n, each of the branch signal lines 120a-120n can have a differential characteristic impedance of about $N\times100\Omega$, and each of the resistances 124a-124n can have a resistance of about $N\times100\Omega$. Since the branch signal lines 120a-120n are arranged electrically in parallel, the branch signal lines 120a-120n collectively form a differential characteristic impedance that matches or substantially matches the differential characteristic impedance of the primary signal line 110. Again, impedance matching can significantly reduce reflections, improve signal integrity, or obtain other benefits. Moreover, as noted above, ground planes can be configured so that the widths W of the primary signal line 110 and the branch signal lines 120a-120n can be equal or substantially equal in some embodiments.

Although FIGS. 3 and 4 illustrate examples of routing topologies 300 and 400 that enable increased loads on single-ended and differential channels, various changes may be made to FIGS. 3 and 4. For example, the splitter 118 may be coupled to any suitable number of branch signal lines 120a-120n, and each branch signal line 120a-120n may be coupled to any suitable number of loads 122a-122n. Also, the angles of the branch signal lines 120a-120n relative to the splitter 118 are examples only and can easily vary. In addition, as noted above, each of the routing topologies 300 and 400 may be used in the system 200 shown in FIG. 2. In that case, the routing topologies 300 and 400 may use the splitter 208 in place of the splitter 118, and the signal lines 110, 120a-120n may be replaced by the signal lines 206, 210a-210n.

Figure 5:
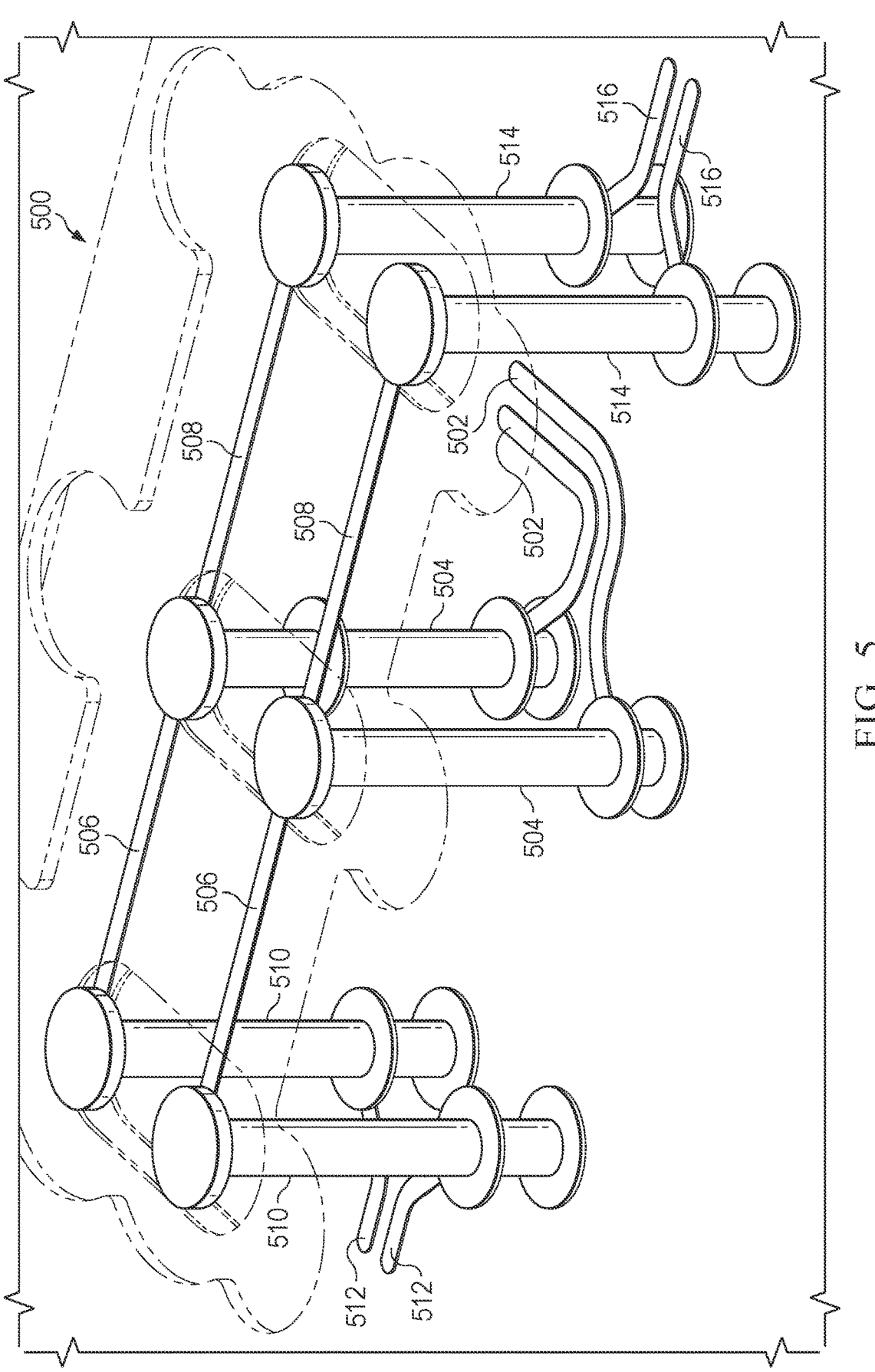
FIG. 5 illustrates an example three-dimensional (3D) model of a splitter for use in routing topologies that enable increased loads on single-ended and differential channels according to this disclosure.

FIG. 5 illustrates an example three-dimensional (3D) model 500 of a splitter for use in routing topologies that enable increased loads on single-ended and differential channels according to this disclosure. For ease of explanation, the model 500 shown in FIG. 5 is described as representing the splitter 118 shown in FIG. 1, which may be used in the routing topologies 300 and 400 shown in FIGS. 3 and 4. However, the model 500 shown in FIG. 5 may be modified to represent any other suitable splitter, such as the splitter 208 shown in FIG. 2.

As shown in FIG. 5, the model 500 here assumes that differential signaling is being used. A pair of input ports 502 can receive two electrical signals forming a differential signal (such as from a primary signal line 110), and the input ports 502 provide the electrical signals to two conductive vias 504. Two electrical conductors 506 are coupled to the conductive vias 504, and two other electrical conductors 508 are coupled to the conductive vias 504. This splits the two electrical signals forming the differential signal into a first pair of electrical signals transported over the electrical conductors 506 and a second pair of electrical signals transported over the electrical conductors 508. The electrical conductors 506 are coupled to two conductive vias 510, which provide the first pair of electrical signals for output via a first pair of output ports 512 (such as to one of the branch signal lines 120a-120n). The electrical conductors 508 are coupled to two conductive vias 514, which provide the second pair of electrical signals for output via a second pair of output ports 516 (such as to another of the branch signal lines 120a-120n). Thus, the model 500 of the splitter uses two conductive pathways, where each conductive pathway is configured to split one of the two electrical signals forming a differential signal. Note that communication can also occur in the reverse direction, meaning from the ports 512 and 516 to the port 502.

In some cases, such as is described in more detail below, the splitter 118 may be fabricated as a stacked structure. For example, different layers of material may be deposited and patterned or otherwise processed to form various structures in or on a printed circuit board or other substrate. When implemented using a stacked structure, different components of the splitter 118 may be formed at different layers or levels within the stacked structure. As a particular example, the input ports 502 may be formed at a specific level within the stacked structure, and the output ports 512 and 516 may be formed two levels above or below that level (with one or more dielectric or other electrically insulative layers in between those levels). The conductive vias 504, 510, 514 can be formed through various levels of the stacked structure, such as by forming openings or vias through electrically insulative material(s) or other material(s) in those levels and filling the vias with electrically conductive material(s). The electrical conductors 506 and 508 can be formed over and electrically connected to the conductive vias 504, 510, 514.

As noted initially, the model 500 here represents the splitter 118 since the model 500 assumes differential signaling is used. If single-ended signaling is used, the model 500 may omit one of each pair of components shown in FIG. 5. Thus, for instance, the model 500 may include one input port 502 coupled to one conductive via 504, which is coupled to one conductor 506 and one conductor 508. The conductor 506 may be coupled to one conductive via 510 and one output port 512, and the conductor 508 may be coupled to one conductive via 514 and one output port 516.

Although FIG. 5 illustrates one example of a 3D model 500 of a splitter for use in routing topologies that enable increased loads on single-ended and differential channels, various changes may be made to FIG. 5. For example, the specific 3D structure of a splitter shown here is for illustration and explanation only. The physical 3D structure of a splitter can vary in any number of ways depending on the specific implementation.

Figure 6:
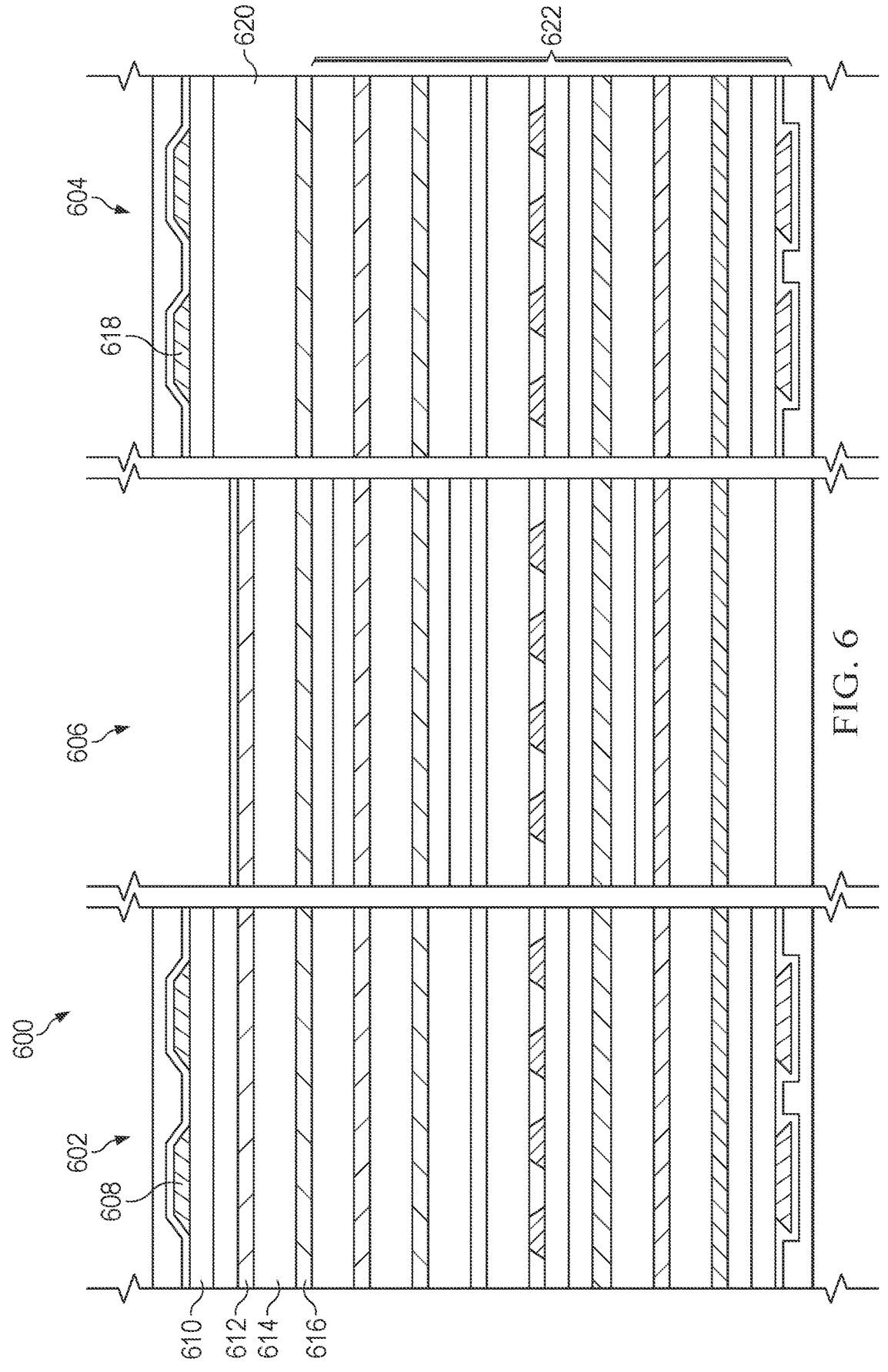
FIG. 6 illustrates an example cross-section used in routing topologies that enable increased loads on single-ended and differential channels according to this disclosure.

FIG. 6 illustrates an example cross-section 600 used in routing topologies that enable increased loads on single-ended and differential channels according to this disclosure. For ease of explanation, the cross-section 600 shown in FIG. 6 is described as including the splitter 118 shown in FIG. 1, which may be designed in accordance with the model 500 shown in FIG. 5 and which may be used in the routing topologies 300 and 400 shown in FIGS. 3 and 4. However, the cross-section 600 shown in FIG. 6 may be modified to include any other suitable splitter, such as the splitter 208 shown in FIG. 2.

As shown in FIG. 6, the cross-section 600 is divided into different sections or regions 602, 604, and 606, which represent different areas where different components used in the routing topologies may be located. Here, a first region 602 represents an area in which a primary signal line 110 is fabricated, a second region 604 represents an area in which one of multiple branch signal lines 120a-120n is fabricated, and third region 606 represents another area lacking the signal lines.

In the first region 602, since the primary signal line 110 is a differential signal line, the primary signal line 110 is formed using two electrical conductors 608. The electrical conductors 608 are formed over one or more dielectric or other insulative layers 610. The one or more insulative layers 610 are formed over a first ground plane 612. At least one dielectric or other insulative layer 614 separates the first ground plane 612 from a second ground plane 616. Since the electrical conductors 608 are relatively close to the first ground plane 612, this can help to facilitate a smaller characteristic impedance for the primary signal line 110. For instance, the first ground plane 612 may be used to provide a ground reference for a 500 electrical trace, and this can be used to provide a 1000 differential characteristic impedance for the primary signal line 110.

In the second region 604, since each branch signal line 120a-120n is a differential signal line, the branch signal line 120a-120n is also formed using two electrical conductors

618. The electrical conductors 618 are formed over one or more dielectric or other insulative layers 620, which separate the electrical conductors 618 from the second ground plane 616. The first ground plane 612 has been cut, removed from, or not formed in the second region 604. Since the electrical conductors 618 are further from the second ground plane 616 compared to the distance between the electrical conductors 608 and the first ground plane 612, this can help to facilitate a larger differential characteristic impedance for the branch signal line 120a-120n. For instance, in some cases, the second ground plane 616 may be used to provide a ground reference for a 1000 electrical trace, and this can be used to provide a 2000 differential characteristic impedance for the branch signal line 120a-120n. In other cases, the second ground plane 616 may be used to provide a ground reference for a 1500 electrical trace, and this can be used to provide a 3000 differential characteristic impedance for the branch signal line 120a-120n.

This approach allows suitable impedances to be created in the primary signal line 110 and the branch signal lines 120a-120n. In some cases, the electrical conductors 608 and 618 can have the same or substantially the same widths, rather than requiring the electrical conductors 618 to be significantly smaller than the electrical conductors. As noted above, higher impedances may often require the use of smaller electrical conductors, so achieving adequately-large impedances for the branch signal lines 120a-120n might ordinarily require their trace widths to be smaller than desired (such as when the smaller trace widths negatively impact the reliability of the structures). The described techniques here allow the higher impedances to be achieved more reliably, possibly while using a constant trace width. As noted initially, the cross-section 600 here assumes differential signaling is used. If single-ended signaling is used, the cross-section 600 may omit one of the electrical conductors 608 and one of the electrical conductors 618.

Note that the separation between the electrical conductor(s) 608 and the first ground plane 612 or between the electrical conductor(s) 618 and the second ground plane 616 can vary depending on the desired impedance to be created for the primary signal line 110 or the branch signal lines 120a-120n. Often times, the relationship between separation and impedance is not linear but is known or determinable by printed circuit board manufacturers or other device manufacturers. In particular embodiments, the electrical conductor(s) 608 and the first ground plane 612 may be separated by about 2.0 mils (about 50.8 microns) to provide a ground reference for creating a 500 single-ended characteristic impedance or a 1000 differential characteristic impedance. The electrical conductor(s) 618 and the second ground plane 616 may be separated by about 9.2 mils (about 233.68 microns) to provide a ground reference for creating a 1000 single-ended characteristic impedance or a 2000 differential characteristic impedance. The electrical conductors 618 and the second ground plane 616 may be separated by about 36.0 mils (about 914.4 microns) to provide a ground reference for creating a 1500 single-ended characteristic impedance or a 3000 differential characteristic impedance.

Various additional layers 622 are shown within the stack of layers in the cross-section 600. These additional layers 622 may be used to form any other desired structures in a routing topology. For instance, the additional layers 622 may be used to fabricate input and output ports 502, 512, 516, and the conductive vias 504, 510, 514 may be formed through these additional layers 622 and other layers as needed.

Although FIG. 6 illustrates one example of a cross-section 600 used in routing topologies that enable increased loads on single-ended and differential channels, various changes may be made to FIG. 6. For example, the specific layers, the specific number of layers, and the thicknesses or other characteristics of those layers can easily vary depending on the fabrication techniques being used and other factors.

The following describes example embodiments of this disclosure that implement or relate to scalable routing topologies that enable increased loads on single-ended or differential channels. However, other embodiments may be used in accordance with the teachings of this disclosure.

In a first embodiment, an apparatus includes a primary signal line configured to transport one or more electrical signals. The apparatus also includes multiple branch signal lines each configured to transport at least one of the one or more electrical signals and each configured to be coupled to one or more loads. The apparatus further includes a splitter coupling the primary signal line and the branch signal lines. The primary signal line has a first characteristic impedance, and the branch signal lines collectively have a second characteristic impedance that matches or substantially matches the first characteristic impedance.

In a second embodiment, a system includes a driver and multiple loads configured to communicate with the driver. The system also includes a primary signal line configured to transport one or more electrical signals between the driver and the multiple loads. The system further includes multiple branch signal lines each configured to transport at least one of the one or more electrical signals and each coupled to one or more of the multiple loads. In addition, the system includes a splitter coupling the primary signal line and the branch signal lines. The primary signal line has a first characteristic impedance, and the branch signal lines collectively have a second characteristic impedance that matches or substantially matches the first characteristic impedance.

In a third embodiment, a method includes transporting one or more electrical signals over a primary signal line and multiple branch signal lines, where each of the branch signal lines is coupled to one or more loads. The method also includes passing the one or more electrical signals through a splitter coupling the primary signal line and the branch signal lines. The primary signal line has a first characteristic impedance, and the branch signal lines collectively have a second characteristic impedance that matches or substantially matches the first characteristic impedance.

Any single one or any suitable combination of the following features may be used with the first, second, or third embodiment. A stacked structure may include multiple layers implementing the primary signal line, the branch signal lines, and the splitter. The multiple layers of the stacked structure may include (i) a first ground plane in a first region of the stacked structure (where the primary signal line may be separated from the first ground plane by a first distance) and (ii) a second ground plane in a second region of the stacked structure (where each of the branch signal lines may be separated from the second ground plane by a second distance larger than the first distance). The first ground plane may not be formed in or may be removed from the second region of the stacked structure. The primary signal line and the branch signal lines may have equal or substantially equal trace widths. N may represent a number of the branch signal lines, and X may represent the first characteristic impedance in ohms. Each of the branch signal lines may have a characteristic impedance that is equal or substantially equal to N×X ohms. Each of the branch signal lines may have a termination resistor at an end of the branch signal line that matches or substantially matches the characteristic impedance of the branch signal line. The one or more electrical signals may include multiple electrical signals, the primary signal line may be configured to transport the multiple electrical signals, and each of the branch signal lines may be configured to transport the multiple electrical signals. The splitter may include multiple conductive pathways, and each of the conductive pathways may be associated with a different one of the multiple electrical signals. The primary signal line and the multiple branch signal lines may support multipoint low-voltage differential signaling between a driver and multiple loads. The multiple branch signal lines may represent two branch signal lines each coupled to nine or more loads, or the multiple branch signal lines may represent three branch signal lines each coupled to six or more loads.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. An apparatus comprising:
a primary signal line configured to transport one or more electrical signals;
multiple branch signal lines each configured to transport at least one of the one or more electrical signals and each configured to be coupled to one or more loads; and a splitter coupling the primary signal line and the branch signal lines;

wherein the primary signal line has a first characteristic impedance; and wherein the branch signal lines collectively have a second characteristic impedance that matches or substantially matches the first characteristic impedance.

2. The apparatus of claim 1, wherein a stacked structure comprises multiple layers implementing the primary signal line, the branch signal lines, and the splitter.

3. The apparatus of claim 2, wherein the multiple layers of the stacked structure comprise:

a first ground plane in a first region of the stacked structure, the primary signal line separated from the first ground plane by a first distance; and a second ground plane in a second region of the stacked structure, each of the branch signal lines separated from the second ground plane by a second distance larger than the first distance.

4. The apparatus of claim 3, wherein the first ground plane is not formed in or is removed from the second region of the stacked structure.

5. The apparatus of claim 4, wherein the primary signal line and the branch signal lines have equal or substantially equal trace widths.

6. The apparatus of claim 1, wherein:

N represents a number of the branch signal lines;

X represents the first characteristic impedance in ohms;

each of the branch signal lines has a characteristic impedance that is equal or substantially equal to N×X ohms; and each of the branch signal lines has a termination resistor at an end of the branch signal line that matches or substantially matches the characteristic impedance of the branch signal line.

7. The apparatus of claim 1, wherein:

the one or more electrical signals comprise multiple electrical signals;

the primary signal line is configured to transport the multiple electrical signals;

each of the branch signal lines is configured to transport the multiple electrical signals; and the splitter comprises multiple conductive pathways, each of the conductive pathways associated with a different one of the multiple electrical signals.

8. A system comprising:

a driver;

multiple loads configured to communicate with the driver;

a primary signal line configured to transport one or more electrical signals between the driver and the multiple loads;

multiple branch signal lines each configured to transport at least one of the one or more electrical signals and each coupled to one or more of the multiple loads; and a splitter coupling the primary signal line and the branch signal lines;

wherein the primary signal line has a first characteristic impedance; and wherein the branch signal lines collectively have a second characteristic impedance that matches or substantially matches the first characteristic impedance.

9. The system of claim 8, wherein a stacked structure comprises multiple layers implementing the primary signal line, the branch signal lines, and the splitter.

10. The system of claim 9, wherein the multiple layers of the stacked structure comprise:

a first ground plane in a first region of the stacked structure, the primary signal line separated from the first ground plane by a first distance; and a second ground plane in a second region of the stacked structure, each of the branch signal lines separated from the second ground plane by a second distance larger than the first distance.

11. The system of claim 10, wherein the first ground plane is not formed in or is removed from the second region of the stacked structure.

12. The system of claim 11, wherein the primary signal line and the branch signal lines have equal or substantially equal trace widths.

13. The system of claim 8, wherein:

N represents a number of the branch signal lines;

X represents the first characteristic impedance in ohms;

each of the branch signal lines has a characteristic impedance that is equal or substantially equal to N×X ohms; and each of the branch signal lines has a termination resistor at an end of the branch signal line that matches or substantially matches the characteristic impedance of the branch signal line.

14. The system of claim 8, wherein:

the one or more electrical signals comprise multiple electrical signals;

the primary signal line is configured to transport the multiple electrical signals;

each of the branch signal lines is configured to transport the multiple electrical signals; and the splitter comprises multiple conductive pathways, each of the conductive pathways associated with a different one of the multiple electrical signals.

15. The system of claim 8, wherein the primary signal line and the multiple branch signal lines support multipoint low-voltage differential signaling between the driver and the multiple loads.

16. The system of claim 8, wherein one of:

the multiple branch signal lines represent two branch signal lines each coupled to nine or more loads; or the multiple branch signal lines represent three branch signal lines each coupled to six or more loads.

17. A method comprising:

transporting one or more electrical signals over a primary signal line and multiple branch signal lines, each of the branch signal lines coupled to one or more loads; and passing the one or more electrical signals through a splitter coupling the primary signal line and the branch signal lines;

wherein the primary signal line has a first characteristic impedance; and wherein the branch signal lines collectively have a second characteristic impedance that matches or substantially matches the first characteristic impedance.

18. The method of claim 17, wherein:

a stacked structure comprises multiple layers implementing the primary signal line, the branch signal lines, and the splitter; and the multiple layers of the stacked structure comprise:

a first ground plane in a first region of the stacked structure, the primary signal line separated from the first ground plane by a first distance; and a second ground plane in a second region of the stacked structure, each of the branch signal lines separated from the second ground plane by a second distance larger than the first distance.

19. The method of claim 18, wherein:

the first ground plane is not formed in or is removed from the second region of the stacked structure; and the primary signal line and the branch signal lines have equal or substantially equal trace widths.

20. The method of claim 17, wherein:

N represents a number of the branch signal lines;

X represents the first characteristic impedance in ohms;

each of the branch signal lines has a characteristic impedance that is equal or substantially equal to N×X ohms; and each of the branch signal lines has a termination resistor at an end of the branch signal line that matches or substantially matches the characteristic impedance of the branch signal line.

\* \* \* \* \*